United States Patent [19]
Kallel

[11] 3,780,980
[45] Dec. 25, 1973

[54] REMOTELY CONTROLLED VENTILATION VALVE

[75] Inventor: Allen Kallel, Santa Ana, Calif.

[73] Assignee: Wemac Company, Santa Ana, Calif.

[22] Filed: June 17, 1971

[21] Appl. No.: 154,215

Related U.S. Application Data

[63] Continuation of Ser. No. 829,672, June 29, 1969, abandoned.

[52] U.S. Cl................. 251/138, 251/140, 251/252, 239/585
[51] Int. Cl............................................. F16k 31/10
[58] Field of Search..................... 251/58, 139, 138, 251/252, 253, 140

[56] References Cited
UNITED STATES PATENTS

| | | | |
|---|---|---|---|
| 2,870,788 | 1/1959 | Hull | 251/58 X |
| 320,105 | 6/1885 | White | 251/138 X |
| 601,351 | 3/1898 | Lewitzki | 251/139 X |
| 1,765,377 | 6/1930 | Marks | 251/138 |
| 2,630,875 | 3/1953 | Sachs | 251/252 X |
| 1,326,046 | 12/1919 | Goodhue | 251/252 X |
| 1,765,377 | 6/1930 | Marks | 251/138 |
| 1,856,350 | 5/1932 | Metcalf | 251/138 X |
| 2,630,875 | 3/1953 | Sachs | 251/252 X |
| 2,732,848 | 1/1956 | Guelson | 137/219 X |
| 2,585,711 | 2/1952 | Whitney et al. | 137/351 X |

Primary Examiner—Arnold Rosenthal
Attorney—Smyth, Roston and Pavitt

[57] ABSTRACT

In an airplane ventilation system an overhead pressurized air outlet directs an air stream downward towards a passenger and is provided with a valve operated by a solenoid-actuated reciprocative means that cooperates with circumferential sets of teeth. The solenoid reciprocates the reciprocative means to cause the fixed teeth to rotate the reciprocative means step-by-step for operating the valve.

12 Claims, 16 Drawing Figures

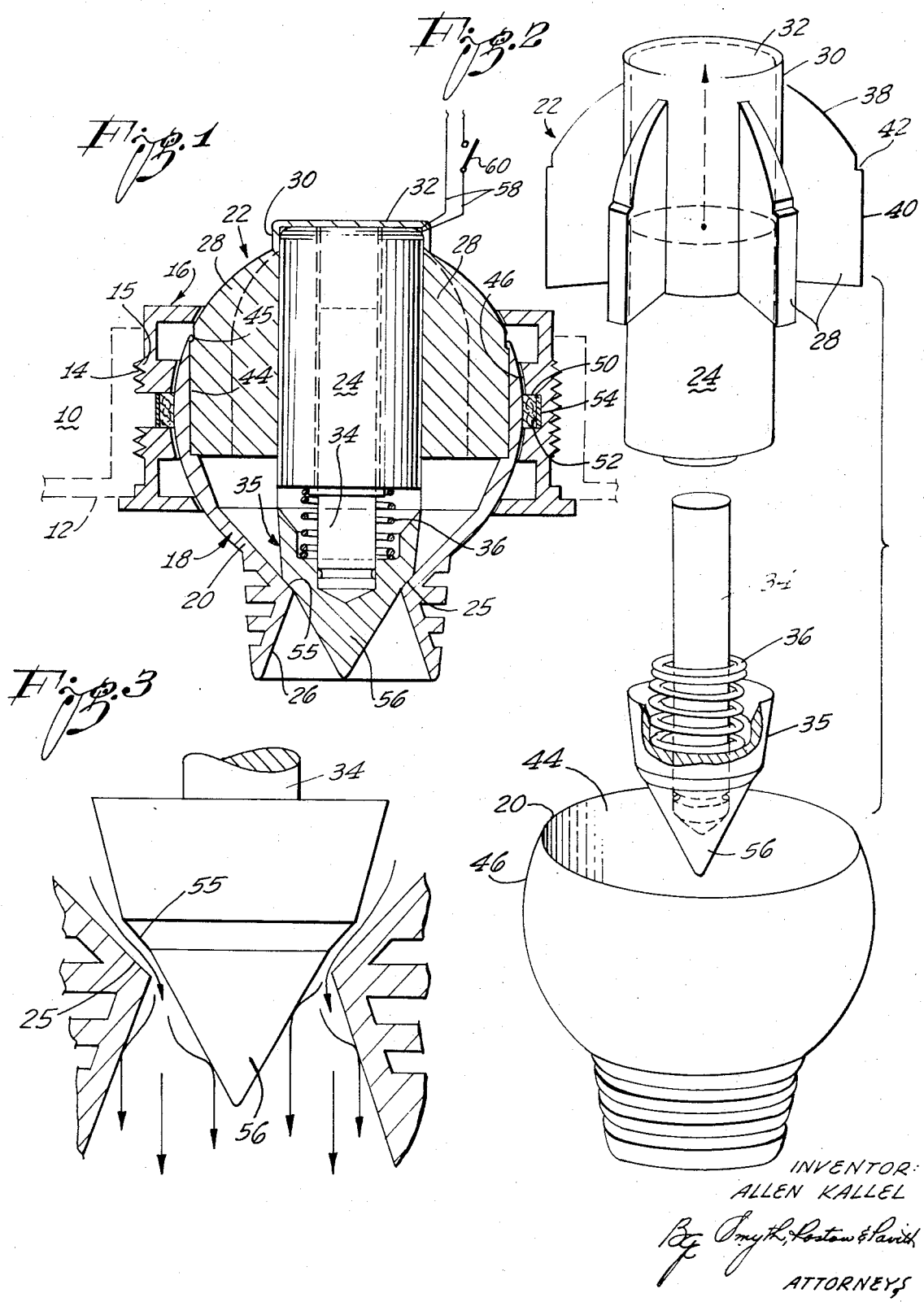

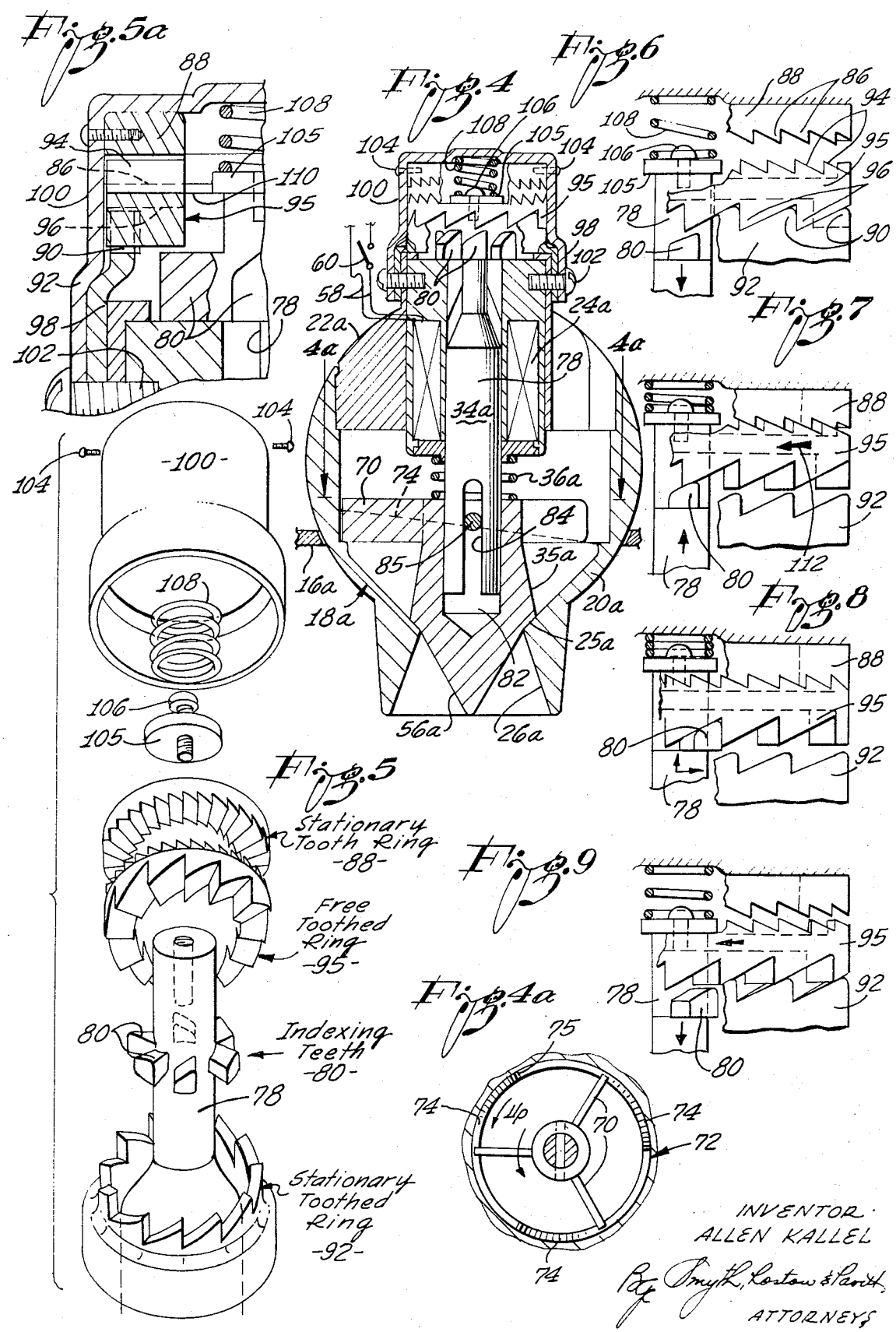

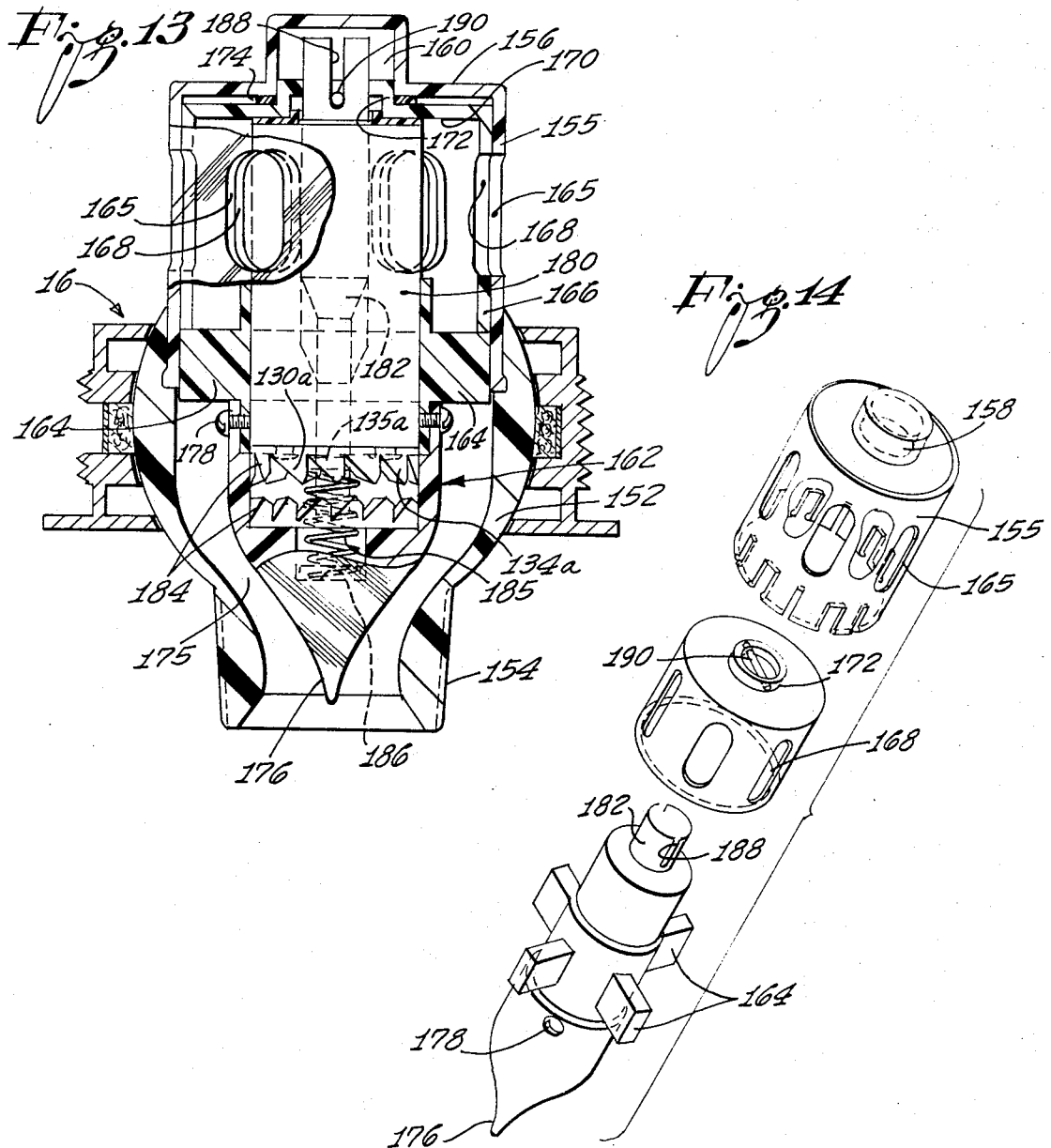

REMOTELY CONTROLLED VENTILATION VALVE

This application is a continuation of Ser. No. 829,672, filed June 29, 1969, and now abandoned.

BACKGROUND OF THE INVENTION

It has been common practice to equip a passenger airplane with a ventilation system wherein a pressurized air duct system provides an individual ventilation outlet for each passenger. Heretofore such an outlet has been within convenient reach of the passenger and has been provided with a valve that is manually operable by the passenger to control air flow from the outlet. For example, a manually operable valve for this purpose is disclosed in the Ross U.S. Pat. No. 2,596,869, which patent is included in the present disclosure by reference.

When an airplane is several seats wide and has a relatively high ceiling, however, the ventilation outlets for the individual passengers are in the ceiling out of convenient reach of the passengers. The present invention meets the need for such ceiling outlets that are provided with individual means for remote control by the passengers.

SUMMARY OF THE INVENTION

In one embodiment of the invention the outlet is formed with an annular valve seat and suitable spring means urges a valve member towards closed position in the valve seat. A solenoid in the outlet is energized when desired by switch means that is conveniently located for the corresponding passenger, the energized solenoid holding the valve open in opposition to the spring means. The valve is either fully open or completely closed.

In a second embodiment of the invention the valve is fixedly connected to a radial follower means that cooperates with a suitable cam means, the follower means climbing a slope of the cam means by steps to retract the valve member from its closed position and eventually dropping over a shoulder of the cam means to reseat the valve member.

A suitable actuating means, which may be termed stepping means, is energized by remote control by a passenger to rotate the radial follower to shift the valve member by steps between open and closed positions.

The stepping means includes a rotary assembly concentric to the valve member that is keyed to the valve member to rotate the valve member with freedom for the assembly to reciprocate axially relative to the valve member. The rotary assembly is reciprocated axially by a solenoid and a cooperating spring means. To cause incremental rotation of the rotary assembly in response to its axial reciprocation the outlet is equipped with the following: a first fixed ratchet ring providing a first circular series of ratchet teeth; a second coaxial fixed ratchet ring providing a second circular series of ratchet teeth, the two fixed rings being spaced axially apart with the ratchet teeth of each fixed ring directed towards the other fixed ring; a floating rotatable ring in the space between the two fixed rings, the floating ring having a third series of ratchet teeth to cooperate with the first fixed circular series of ratchet teeth and having a fourth circular series of ratchet teeth to cooperate with the second series of fixed teeth; and radial index teeth carried by the rotary assembly to cooperate with the fourth series of ratchet teeth.

Energization of the solenoid to shift the rotary assembly axially in one direction causes, first, incremental rotation of the floating ring in the opposite direction by the first fixed series of ratchet teeth and then incremental rotation of the rotary assembly in said one direction by cooperation of the radial index teeth of the rotary assembly with the fourth series of ratchet teeth on the ring. Deenergization of the solenoid to cause the spring means to return the rotary assembly axially causes cooperation of the fourth series of ratchet teeth on the ring with the second fixed series of ratchet teeth to advance the ring in said opposite direction to place the ring in a new starting position.

In a third embodiment of the invention, the axially movable valve member is fixedly connected to a radial follower means that cooperates with an inner circumferential cam means to move the valve member to open and closed positions in the same manner as the second embodiment of the invention. Also like the second embodiment, the rotary assembly is keyed to the valve member to rotate the valve member with freedom for the rotary assembly to reciprocate axially relative to the valve member, the rotary assembly being reciprocated axially by a solenoid and a cooperating spring means. The third embodiment differs from the second embodiment, however, in the construction of the stepping means to cause incremental rotation of the rotary assembly in response to its axial reciprocation.

Incremental rotation of the rotary assembly in response to its axial reciprocation is accomplished by two fixed circumferential series of teeth in cooperation with radially indexing means of the rotary assembly. The two fixed circumferential series of ratchet teeth are coaxial and are spaced apart axially with the teeth of each series directed towards the teeth of the other series. The radial indexing means that is carried by the rotary assembly preferably comprises two radial arms that extend between the two opposed series of fixed teeth. When the solenoid is energized to shift the rotary assembly in one axial direction, the radial arms are forced against one of the fixed series of ratchet teeth to be cammed thereby for an increment of rotation of the rotary assembly in one rotary direction and when the solenoid is deenergized the spring means returns the rotary assembly to cause the radial arms to cooperate with the other fixed series of ratchet teeth to be cammed thereby for an additional increment of rotation of the rotary assembly in the same direction.

The third embodiment of the invention is further characterized by the cam means comprising a circumferential series of nine cam elements and the follower means comprising three follower arms 120° apart to cooperate with the nine cam elements. The two fixed series of ratchet teeth are arranged to cause complete rotation of the rotary assembly in 27 steps carried out by 27 energizations of the solenoid. Thus there are three steps of incremental advance for each of the nine cam elements so that an initial energization of the solenoid advances the radial followers part way up the slopes of the cam elements to retract the valve member slightly from its seat, a second energization of the solenoid advances the radial follower arms still further up the slopes of the cam elements to retract the valve member still further from its seat, and a third energization of the solenoid advances the three radial followers over the crests of the cam elements to return the valve member to closed position.

A fourth embodiment of the invention incorporates a valve having a valve sleeve that rotates to open and closed positions. An axial assembly is slidingly keyed to the valve sleeve and is reciprocated by a solenoid to cause two confronting circumferential sets of teeth to rotate the reciprocative means step-by-step for operation of the valve sleeve.

A feature of all four embodiments of the invention is that the valve body is of the general configuration of a sphere and is captivated by a surrounding cage in a manner that permits rotation of the valve body in any desired direction with the spherical peripheral surface of the valve body provided in part by a shell and in part by the legs of a spider that supports the valve solenoid. The rim of the shell is telescoped over the legs of the spider and is clinched thereto. The shell has a circumferentially continuous spherically curved peripheral surface and the spherical configuration of this peripheral surface is continued by arcuate edges of the spider legs. This construction is economical to fabricate and makes it possible to employ a solenoid that is relatively long to provide the power required for satisfactory valve action.

The features and advantages of the invention may be understood from the following detailed description and the accompanying drawings.

BRIEF DESCRIPTION OF THE DRAWINGS

In the drawings, which are to be regarded as merely illustrative:

FIG. 1 is a sectional view of the first embodiment of the invention;

FIG. 2 is an exploded view showing the two parts of a valve body, the solenoid and the valve member that is actuated by the solenoid;

FIG. 3 is an enlarged fragmentary sectional view indicating the character of the airstream that is projected by the outlet valve;

FIG. 4 is a sectional view of the second embodiment of the invention;

FIG. 4a is a section along the line 4a — 4a of FIG. 4 showing how three radial follower arms cooperate with three arcuate cam elements;

FIG. 5 is an exploded perspective view showing the rotary assembly and the four sets of ratchet teeth;

FIG. 5a is a greatly enlarged fragmentary sectional view showing an indexing tooth of the rotary assembly and the four series of ratchet teeth;

FIGS. 6 to 9 are diagrammatic fragmental elevational views showing successive stages in the operation of the stepping mechanism;

FIG. 13 is a sectional view of the fourth embodiment of the invention; and

FIG. 14 is an exploded perspective view of the parts of the fourth embodiment.

DESCRIPTION OF THE EMBODIMENTS OF THE INVENTION

Figure 10:
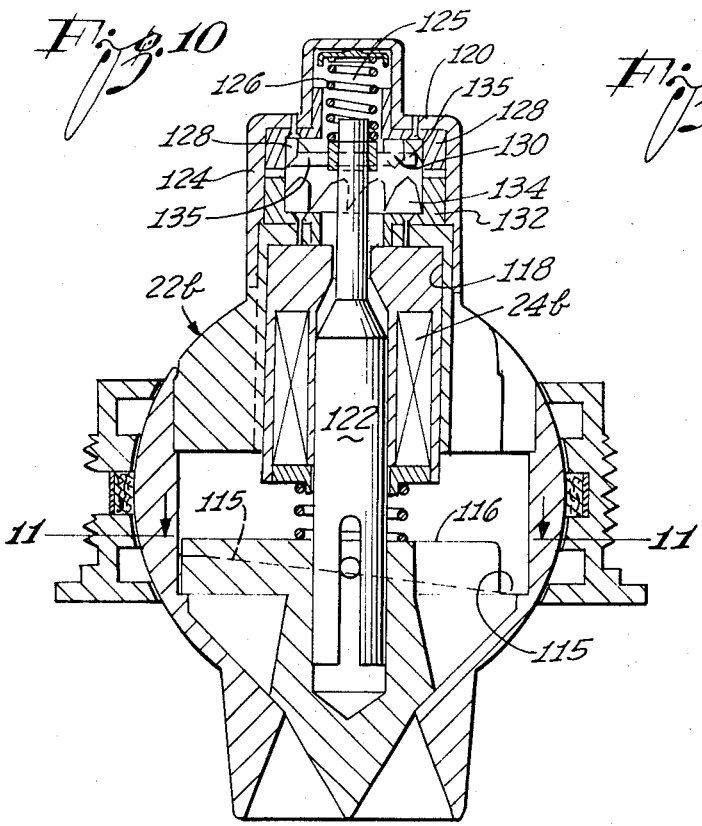
FIG. 10 is a sectional view of the third embodiment of the invention.

Referring to the first embodiment of the invention shown in FIGS. 1 – 3, FIG. 1 indicates in phantom a pressurized air duct 10 that terminates in an opening in a ceiling 12, the air duct having an internal screw thread 14 for engagement by the external screw thread 15 of a cage 16 that captivates a spherically curved valve body, generally designated 18. The valve body 18 which forms an air passage therethrough is made in two parts, namely a shell 20 and spider, generally designated 22, the purpose of the spider being to support a solenoid 24 in a position axially of the air passage.

The shell 20 forms a conically curved valve seat 25 at the discharge end of the air passage and additionally forms a flared nozzle 26 beyond the valve seat. The spider 22 has six radial legs 28 that divide the air passage into six segments and the six legs radiate from a cylindrical receptacle 30 for the solenoid 24, the receptacle having a transverse end wall 32. The solenoid 24 which is fixedly mounted in the cylindrical receptacle 30 has an armature 34 on which a valve member 35 is fixedly mounted for cooperation with the valve seat 25, the valve member being urged towards closed position by a suitable coil spring 36.

A feature of the invention is that dividing the valve body 18 into two sections makes possible a simple and inexpensive fabrication procedure in which the rim of the shell 20 is telescoped over the spider legs 28 and is simply clinched to the spider legs. For this purpose, as may be seen in FIG. 2, each spider leg 28 has an arcuate edge portion 38 that conforms to the curvature of a sphere and has a straight edge portion 40 that is parallel to the axis of the spider, the straight edge portion forming a shoulder 42 at its juncture with the arcuate edge portion. The shell 20 is formed with an inner circumferential cylindrical wall 44 that telescopes over the straight edge portions 40 of the six spider legs and the rim of the shell is clinched into engagement with the shoulders 42 of the spider legs as indicated at 45 in FIG. 1. The shell 20 has a circumferentially continuous peripheral surface 46 that conforms to a spherical configuration and the arcuate edge portions 38 of the spider legs 28 conform to the same spherical configuration.

To frictionally hold the valve body 18 in a desired position of adjustment relative to the cage 16, the cage has a spherical inner surface to conform to the spherical curvature of the valve body and this spherical inner surface is formed with an annular groove 50 in which is mounted a springurged gasket assembly. A gasket member 52 of the gasket assembly is preferably formed of a strip of fibrous material, such as felt, and is disposed in the groove 50, the gasket member being urged inwardly somewhat radially of the cage by one or more resilient metallic strips 54.

A feature of the invention is the manner in which the valve body 18 in cooperation with the valve member 35 forms a tubular airstream which expands somewhat as it approaches the passenger. For this purpose the valve seat 25 and a circumferential portion 55 of the valve member 35 that mates with the valve seat are tapered at an angle of 45° relative to the axis of the valve member and the valve member is formed with a conical nose 56 that projects beyond the valve seat and is tapered at an angle of approximately 60° relative to the axis of the valve member. When the valve member is retracted to open position as shown in FIG. 3, the circumferential portion 55 of the valve member and the valve seat 25 cooperate to form an annular jet that converges on the conical nose 56 and is diverted by the nose with the consequent formation of a concentrated tubular airstream that gradually expands as it approaches the seated passenger.

As indicated diagrammatically in FIG. 1, the two wires 58 of the solenoid 24 are in a circuit energized by a suitable EMF source and the circuit includes a switch 60 which is conveniently located for manual operation by the seated passenger, the switch, for example being mounted on an arm rest of the seat. Thus each passenger has the choice of opening or closing the corresponding outlet valve.

Since the outlet valve points downwardly from the ceiling, the solenoid must oppose gravitational force on the valve head in addition to the force of the spring 36 and the fluid pressure differential on the valve member. Because of these three resisting forces a relatively large solenoid is required and the problem arises of how to mount such a relatively large solenoid in the valve body. This problem is solved by the provision of a spider of relatively long axial dimension, the spider extending substantially rearwardly of the cage 16.

THE SECOND EMBODIMENT OF THE INVENTION

The second embodiment of the invention shown in FIGS. 4 – 9 is largely similar to the first embodiment as indicated by the use of corresponding numerals to indicate corresponding parts.

The valve member 35a which is urged to closed position by a coil spring 36a is integral with three radial follower arms 70 that are spaced 120° apart and cooperate with a circumferential cam means 72 for retracting the valve member from closed position in opposition to the coil spring. As shown in FIG. 4a the circumferential cam means 72 is divided into three cam elements 74 of 120° each, each cam element sloping upward to an abrupt shoulder 75 that permits the follower to drop to the beginning of the next cam element with consequent closing movement of the valve member.

It is contemplated that suitable stepping means will be provided to rotate the valve member and radial follower arms incrementally. Preferably as in the second embodiment three increments are required to carry out a valve cycle, the first increment carrying the follower arms 70 part way up the three corresponding cam elements 74 for retraction of the valve member to a partially open position, the second increment advancing the three follower arms further up the slope of the three cam elements to move the valve member to a wider open position, and the third increment moving the radial follower arm 70 over the crests of the cam elements to permit the radial follower arms to drop to the beginning of the next cam elements with consequent closing movement of the valve member.

The incremental or step by step rotation of the valve member and the three radial follower arms is carried out by what may be termed a rotary assembly in cooperation with a plurality of cooperative circumferential series of ratchet teeth.

The rotary assembly comprises a stem 78 which incorporates the solenoid armature 34a and further includes a circumferential series of indexing teeth 80 that extend radially from the stem. The rotary assembly is slidingly keyed to the valve member 35a for incremental rotation of the valve member with freedom for the rotary assembly to reciprocate axially relative to the valve member. For this purpose, the stem 78 extends into an axial bore 82 of the valve member in a sliding manner and is formed with a longitudinal slot 84 that straddles a diametrical pin 85 of the valve member.

The rotary assembly cooperates with four circumferential series of ratchet teeth, namely: a first fixed series of upper circumferential ratchet teeth 86 formed by an upper fixed ring 88; a second lower fixed circumferential series of ratchet teeth 90 formed by a lower fixed ring 92; a third circumferential series of ratchet teeth 94 formed on the upper side of a floating rotary ring 95 for cooperation with the fixed first series of ratchet teeth 86; and a fourth circumferential series of ratchet teeth 96 formed on the lower side of the floating ring 95 for cooperation with the fixed second series of ratchet teeth 90.

As indicated in FIGS. 4 and 5a the lower fixed ring 92 is formed with an enlarged skirt 98 that telescopes over a tubular portion of the spider 22a and a cup-shaped cap 100 telescopes over the skirt, suitable screws 102 extending through the cap, the skirt, and the tubular portion of the spider into the solenoid 24a to fixedly interconnect the parts. The upper fixed ring 88 is secured inside the cap 100 by suitable screws 104 and the floating ring 98 is slidably and rotatably confined by the cap. A suitable washer 105 that is anchored to the upper end of the stem 78 by a screw 106 (FIG. 5) forms a radial flange on the upper end of the stem that overhangs and abuts the floating ring 95 in a region that is radially inwardly of the third series of ratchet teeth 94. A suitable coil spring 108 acts in compression between the end wall of the cap 100 and the disk 105 to urge rotary assembly downward when the solenoid 24a is not energized.

As may be understood by reference to FIG. 5a the indexing teeth 80 of the rotary assembly rotate inside the radius of the lower fixed ring 92 and the lower series of ratchet teeth 96 on the floating ring 95 overhang both the lower fixed series of ratchet teeth 90 on the lower ring 92 and the indexing teeth 80 of the rotary assembly. Thus as may be seen in FIG. 5a, both the indexing teeth 80 and the lower fixed series of teeth 90 may cooperate with the series of ratchet teeth 96 on the underside of the floating ring 95.

It is to be further noted in FIGS. 5a that the flange of the rotary assembly that is formed by the disk 105 engages an inner annular shoulder 110 of the floating ring 95. It is apparent then that the disk 105 constitutes a radial projection of the rotary assembly that extends over the upper side of the floating ring 95 and the indexing teeth 80 of the rotary assembly extends under the floating ring, the rotary assembly in effect straddling the floating ring with freedom for axial movement of the floating ring relative to the rotary assembly as well for freedom for relative rotation of the floating ring.

With the spatial relationships shown in FIG. 5a in mind, the stepping operation in response to axial reciprocation of the rotary assembly may be understood by referring to FIGS. 6 to 9.

In FIG. 6 the solenoid is deenergized and the spring 108 holds the rotary assembly at its normal lowermost position. The floating ring 95 rests on the lower fixed ring 92 with the lower series of ratchet teeth 96 of the floating ring meshed with the fixed lower series of ratchet teeth 90 of the lower ring 92. As may be seen in FIG. 6, the floating ring 95 is spaced below the upper fixed ring 88 at this time with the upper series of ratchet teeth 94 of the floating ring staggered with respect to the fixed upper series of ratchet teeth 86 of the upper ring 88.

When the solenoid 24a is energized to lift the rotary assembly two actions occur in sequence. The first action illustrated by FIG. 7 is that the indexing teeth 80 of the rotary assembly lift the floating ring 95 upward to cause initial engagement of the upper series of ratchet teeth 94 of the floating ring with the fixed upper series of ratchet teeth 86 of the upper fixed ring 88. Since the teeth 94 are staggered relative to the teeth 86 as shown in FIG. 7 when initial contact occurs, it is apparent that further lifting of the floating ring 95 by the indexing teeth 80 causes an increment of rotation of the floating ring to the left as indicated by the arrow 112, the increment of movement being caused by camming action between the teeth 94 and the teeth 86. The purpose of this increment of rotation of the floating ring 95 is to shift the lower teeth 96 of the floating ring past the crests of the fixed lower series of ratchet teeth 90 of the lower fixed ring 92 as shown in FIG. 8. It is apparent in FIG. 8 that as a result of the increment of leftward rotation of the floating ring subsequent dropping of the floating ring on to the lower fixed ring 92 results in advancing the floating ring leftward by one tooth of the lower fixed ring.

After the upper teeth 94 of the floating ring fully mesh with the upper fixed teeth 86 continued upward movement of the indexing teeth of the rotary assembly causes the indexing teeth to be cammed to the right by sliding movement of the indexing teeth along the inclined surfaces of the lower teeth 96 of the floating ring as may be understood by comparing FIGS. 8 and 9. This camming action rotates the three radial follower arms 70 one step counterclockwise as indicated in FIG. 4a. This increment of movement may, for example, shift the radial follower arms approximately one third of the circumferential extent of the corresponding cam elements 74.

When the solenoid is then deenergized to cause the indexing teeth 80 to fall away from the floating ring 95, the action of the spring 108 on the rotary assembly forces the floating ring downward against the lower fixed ring 92. Initially the lower teeth 96 of the floating ring make contact with the fixed teeth 90 of the lower ring 92 at points near the crests of the fixed teeth as may be seen in FIG. 9. Further downward movement of the floating ring 95 under the force of the spring 108 causes a second increment of leftward rotation of the floating ring by cam action as the floating ring gravitates back to its starting position shown in FIG. 6.

The sequence represented by FIGS. 6 to 9 may be summarized as follows: first the upper teeth 94 of the floating ring and the upper fixed teeth 86 cooperate for an initial increment of leftward rotation of the floating ring to carry the lower teeth 96 of the floating ring past the crests of the lower fixed teeth 90; then with the floating ring 95 immobilized by meshing of its upper teeth 94 with the upper fixed teeth 86, the indexing teeth 80 of the rotary assembly cam along the lower teeth 96 of the rotary ring for an increment of rightward rotation of the rotary assembly; and, finally, the floating ring is dropped onto the lower fixed ring 92 for a second increment of leftward rotation of the floating ring to place the floating ring in a starting position. It is apparent that the total of the two increments of leftward rotation of the floating ring 95 is equal to the circumferential extent of one of the lower fixed teeth 90, each reciprocation of the rotary assembly advancing the rotation of the floating ring by the length of one fixed tooth 90 of the lower ring 92.

With the valve member 35a at its closed position and with each of the three radial follower arms 70 at the bottom of the slope of the corresponding cam element 74 and with the initial reciprocation of the rotary assembly advancing each radial follower arm one third way up the slope of the corresponding cam element, the valve is opened to a relatively small degree by one energization of the solenoid and the next energization advances the cam arms two thirds way up the corresponding cam elements to open the valve to greater degree. The third energization of the solenoid advances the radial follower arms over the crests of the cam elements to permit the spring 36a to close the valve. Thus with the outlet port closed, the passenger may depress a push button switch once to create an airstream of relatively low volume or may depress the push button twice for a greater rate of air flow. With the valve member at its first open position, two successive depressions of the push button closes the valve and with the valve at its second open position only one depression of the push button closes the valve.

THIRD EMBODIMENT OF THE INVENTION

Figure 11:
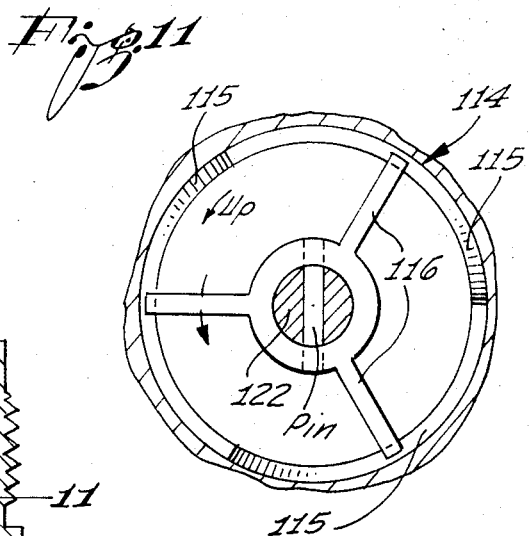
FIG. 11 is a transverse section taken as indicated by the line 11 — 11 of FIG. 10 showing how the three radial follower arms cooperate with nine cam elements.
Figure 12:
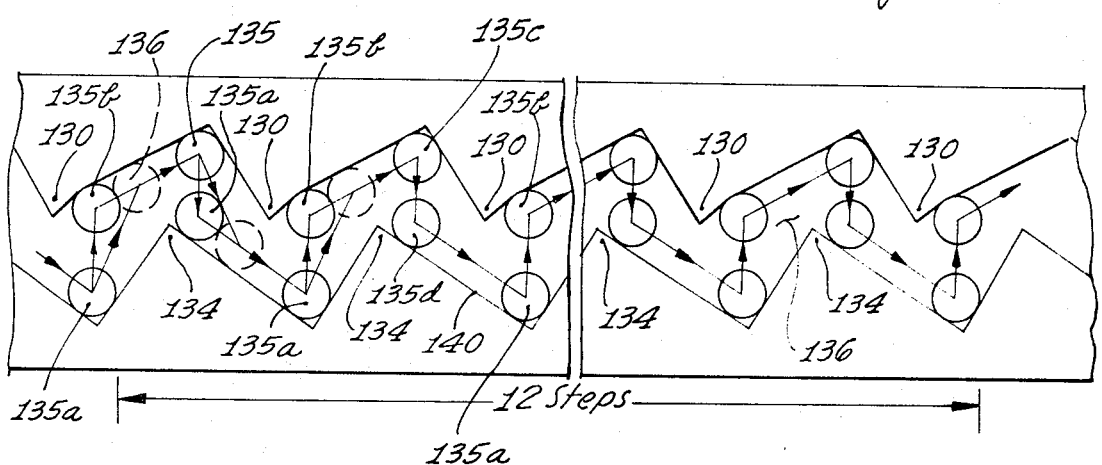
FIG. 12 is a greatly enlarged diagrammatic elevational view showing how a radial indexing arm of the rotary assembly cooperates with the two fixed series of ratchet teeth for step by step rotation of the three radial follower arms.

The construction of the third embodiment of the invention shown in FIGS. 10 to 12 is largely similar to the above described constructions as indicated by the use of corresponding numerals to indicate corresponding parts.

In this embodiment an inner circumferential cam means 114 shown in plan in FIG. 11 is divided into three cam elements 115, the cam elements being traversed by three radial follower arms 116. As in the second embodiment, three actuations of the solenoid 24b are required for a complete valve cycle, the valve cycle comprising initial partial opening of the valve, subsequently greater opening of the valve and finally closing of the valve on the third reciprocation of the rotary assembly.

In the construction shown in FIG. 10 the spider 22b forms a cylindrical receptacle 118 having an annular top wall 120 that surrounds a stem 122 of the rotary assembly. A cap 124 telescopes over the upper end of the receptacle 118 and the upper transverse wall of the cap is formed with a well 125 that serves as a cage for a coil spring 126 that exerts downward pressure on the upper end of the stem. The cap 124 forms a chamber in which an upper ring 128 with downwardly extending ratchet teeth 130 is fixedly attached to the upper wall of the cap and a lower ring 132 with upwardly extending ratchet teeth 134 is fixedly mounted on the annular top wall 120 of the receptacle 118.

The stem 122 of the rotary assembly is provided with suitable radial indexing elements for cooperation with the two sets of ratchet teeth 130 and 134. In the construction shown, the indexing elements are in the form of a dimetrical pin forming two radial arms 135 that extend between the upper and lower fixed teeth 130 and 134.

As indicated diagrammatically in FIG. 12, the two sets of opposed ratchet teeth 130 and 134 are staggered relative to each other to form a circumferentially continuous zig-zag slot 135 into which the two radial arms 135 extend. In this instance there are 12 upper ratchet teeth 30 and twelve lower rachet teeth 34, the lower ratchet teeth forming 12 valleys for step-by-step rotation of the rotary assembly. Thus there are three steps of rotation of the radial follower arms 116 for each of the cam elements 115.

Referring to FIG. 12, when the solenoid 24b is deenergized, each of the two radial indexing arms 135 rests at a position 135a in a valley formed by the lower ratchet teeth 34. When the solenoid 24b is energized, each of the radial indexing arms is raised vertically to a position 135b where the indexing pin meets a slope 138 of an upper ratchet tooth 130. The continued upward pull of the solenoid causes the radial indexing arm to move by cam action along the slope 138 to an upper limit position 135c. When the solenoid is subsequently deenergized, each radial indexing arm drops to a position 135d in contact with a slope 140 of a lower ratchet tooth 134 and then progresses down the slope by cam action back to a starting position 135a. Thus a single axial reciprocation of the rotary assembly rotates the rotary assembly through one-twelfth of a revolution to cause each radial follower arm 116 to traverse approximately one-third of the length of a cam element 115.

THE FOURTH EMBODIMENT OF THE INVENTION

The first three embodiments of the invention incorporating poppet type valves with concentric annular valve seats are suitable for ventilation systems in which the air is under relatively high pressure. If the air supplied by the ventilation system is under relatively low pressure, however, substantially greater flow capacity is required to discharge the air at a sufficient rate. The fourth embodiment of the invention, therefore, provides for relatively great air flow of low pressure air by employing a sleeve valve instead of a poppet valve.

FIG. 13 shows a valve body mounted in a previously described cage 16 with freedom both for rotation and for angular adjustment, the valve body having a spherically curved portion 152 embraced by the cage. The valve body further has a nozzle portion 154 at one end and a cylindrical receptacle 155 at the other end, the cylindrical receptacle having an end wall 156 with an axial offset 158 that forms an internal cavity 160. Fixedly mounted inside the valve body is a spider, generally designated 162, having four narrow radial support arms 164.

The cylindrical wall of the receptacle 155 serves as the stationary sleeve of a sleeve valve and for this purpose has a circumferential series of elongated openings 165. In this instance there are six openings which are spaced apart by approximately 1/12 of a circle. Rotatably mounted inside the receptacle 155 is a rotatable sleeve valve member 166 which has a corresponding circumferential series of six elongated openings 168. It is apparent that when the valve is closed, i.e., when the openings 168 of the rotatable valve sleeve 166 register with the blank portions of the surrounding receptacle 155, 1/12 of a revolution of the inner sleeve valve member will bring the openings 168 into register with the openings 165. Thus one increment of rotation equal to 1/12 of a revolution of the valve sleeve 166 will open the valve and the next increment will close the valve.

The rotatable valve sleeve 166 is circumferentially embraced by the surrounding receptacle 155 and is confined between the spider arms 164 and the end wall 156. In the construction shown the valve sleeve 166 has an end wall 170 that is formed with an axial portion 172 that is journalled in the receptacle cavity 160 and a suitable washer 174 is interposed between the end wall 156 of the receptacle and the end wall 170 of the valve sleeve.

The valve body and the spider 162 cooperate to form an annular passage 175 that terminates in the nozzle portion of the valve body. When the openings 168 of the rotary valve sleeve 166 register with the stationary openings 165 of the surrounding receptacle 155, the ventilation air that is supplied under pressure flows into the interior of the valve sleeve through the registered openings and then flows past the support arms 164 of the spider 162 for discharge from the valve body. The annular passage 175 is of double curved configuration in longitudinal cross section and the spider has a needle pointed nose 176 that extends through the narrowest portion of the nozzle to minimize turbulence in the air stream that is discharged by the nozzle.

The spider 162 may be made in two parts for convenience of access, the two parts being telescoped together and being secured together by suitable radial screws 178. As seen in FIG. 13, the upper portion of the spider encases a solenoid coil 180 and suitable reciprocative means mounted in the spider comprises an axial armature 182. The armature 182 is provided with indexing means comprising two radial arms 135a that are formed by a diametric pin, the two radial indexing arms having the same function as the previously described lateral indexing arms 135 in FIG. 10. The construction is also similar to that shown in FIG. 10 in the inclusion of two spaced rings 184 that are formed with two confronting sets of ratchet teeth 130a and 134a for cooperation with the radial indexing arms 135a. As heretofore explained, the two sets of opposed ratchet teeth 130a and 134a are staggered relative to each other to form a circumferentially continuous zig-zag slot into which the two radial indexing arms 135a extend. The two radial indexing arms 135a rest on a suitable coil spring 185 in a well 186, the spring serving to bias the armature 182 upwardly. For the purpose of keying the armature 182 to the rotary valve sleeve 166 for rotation of the valve sleeve by the armature without axial movement of the valve sleeve, the upper end of the armature is provided with a diametrical slot 188 which straddles a diametrical pin 190 that is mounted in the axially offset portion 172 of the valve sleeve.

The operation of the fourth embodiment of the invention may be readily understood. Normally the solenoid coil 180 is deenergized and the armature 182 is supported by the coil spring 185 at its upper limit position, at which limit position the two radial indexing arms 135a press against valleys formed by the upper ratchet teeth 130a. It is contemplated that the circuit for energizing the solenoid coil 180 by remote control will include a suitable switch such as a push button switch. Depressing the pushbutton to close the solenoid circuit causes the armature 182 to be attracted downward from pressure engagement with the upper set of ratchet teeth 130a into pressure engagement with the lower set of ratchet teeth 134 and releasing the push button permits the coil spring to return the armature to its normal upper position with consequent rotation of the armature by an increment of 1/12 of a revolution as heretofore explained.

It is apparent that if the sleeve valve is closed, depressing and then releasing the push button will cause reciprocation of the armature 182 with a consequential increment of rotation of the valve sleeve 166 to open the valve by placing the openings 168 of the valve sleeve 166 in register with the outer openings 165. When the valve is open depressing the switch button momentarily results in rotation of the valve sleeve to closed position.

My description in specific detail of the selected embodiments of the invention will suggest various changes, substitutions and other departures from my disclosure.

I claim:

1. Means to control fluid flow through a passage having an axis, comprising:
   valve means including a rotary valve member in the passage to control fluid flow therethrough;
   tooth means including fixed teeth arranged concentrically of the axis of the passage;
   reciprocative means in said passage free to reciprocate longitudinally thereof, said reciprocative means being cooperative with said teeth for rotation of the reciprocative means in response to its longitudinal reciprocation, whereby the motion of the reciprocative means has both an axial component and a rotary component,
   said valve member being slidingly keyed to said reciprocative means for rotation in response to the rotary component of the motion of the reciprocative means without response to the axial component of the movement of the reciprocative means; and
   power means to reciprocate the reciprocative means.

2. A combination as set forth in claim 1, in which said valve member is a rotary valve.

3. Means to control fluid flow through a passage comprising:
   valve means in the passage to control fluid flow therethrough;
   tooth means including fixed teeth arranged concentrically of the axis of the passage;
   elongated reciprocative means in said passage free to reciprocate longitudinally in the passage, said reciprocative means being cooperative with said teeth for rotation of the reciprocative means in response to its reciprocation, and
   means to move said valve member axially in response to rotation of the reciprocative means including a circumferentially arranged fixed cam means, a follower means operatively connected to the reciprocative means for rotation thereby in contact with the fixed cam means to cause axial movement of the follower means with the valve member being operatively connected to the follower means to cause axial movement of the valve member in response to axial movement of the follower means.

4. A combination as set forth in claim 3 in which one increment of rotation of the follower means in response to one reciprocation of the reciprocative means moves the valve member from closed position to open position; and
   in which a subsequent increment of rotation of the follower means in response to one reciprocation of the reciprocative means moves the valve member to closed position.

5. A combination as set forth in claim 3 which includes spring means biasing said reciprocative means to one limit of its range of reciprocation;
   and which includes solenoid means for intermittent energization to urge the reciprocative means to its opposite limit position in opposition to said spring means.

6. In a valve to control fluid flow through a passage, the combination of:
   an annular valve seat formed in the passage;
   a valve member to cooperate with said valve seat to control the rate of fluid flow through the passage, said valve member being movable between a closed position and an open position relative to the valve seat;
   annular cam means extending around the interior of the passage and divided into a plurality of cam elements, each cam element extending a given number of degrees around the interior of the passage, each cam element sloping from a given distance from the valve seat to a greater distance and dropping back to the given distance;
   first radial means operatively connected to the valve member to retract the valve member from the valve seat in response to rotation of the radial means along the slope of a cam element and to reseat the valve member in response to dropping back to the given distance;
   teeth means comprising two fixed annular sets of teeth in said passage, the two sets of teeth being staggered relative to each other;
   second radial means keyed to the first radial means for rotation thereof with freedom for axial movement relative thereto;
   actuating means operable to cause an axial reciprocation of said second radial means into engagement with said two sets of teeth alternately to cause rotation of said second radial means by an increment of a magnitude less than said given number of degrees thereby to advance the first radial means by less than said given number of degrees,
   whereby a single operation of said actuating means retracts the valve member from closed position to an open position and additional operation of said actuating means reseats the valve member.

7. A combination as set forth in claim 6 in which said given number of degrees is a multiple of the number of degrees of said increment.

8. A combination as set forth in claim 6 which includes:
   first spring means urging said valve member to closed position and urging said first radial means against said cam means;
   and in which said actuating means comprises second spring means to urge said second radial means in one axial direction and a solenoid to move the second radial means in the opposite radial direction in opposition to the second spring means.

9. Means to control fluid flow through a passage, comprising:
   valve means to control fluid flow through the passage, said valve means including a sleeve member rotatable to open and close the passage;
   a first fixed circular series of teeth;

a second fixed circular series of teeth positioned coaxially with the first series, said two circular series of teeth being spaced apart axially with the teeth of each series being directed towards the other series, the teeth of each said two series being staggered relative to the teeth of the other series;

a rotatable assembly reciprocative axially of said two sets of teeth;

power means operable to reciprocate the rotatable assembly;

means on said rotatable assembly cooperative with said two sets of teeth to rotate the assembly by an increment in response to reciprocation of the assembly, and said assembly being slidingly keyed to said sleeve member to rotate the sleeve member without moving the sleeve member axially.

10. A combination as set forth in claim 9 in which said increment of rotation is of sufficient magnitude to rotate said sleeve member from closed position to open position and is of sufficient magnitude to rotate the sleeve member from open position to closed position.

11. A combination as set forth in claim 10 in which said increment is of a magnitude for two successive increments to first rotate the sleeve member to open position and then to rotate the sleeve member to closed position.

12. In a valve to control fluid flow through a passage, the combination of:

an annular valve seat formed in the passage;

a valve member to cooperate with said valve seat to control the rate of fluid flow through the passage, said valve member being movable between a closed position and an open position relative to the valve seat;

arcuate cam means in the passage rising from a given distance from the valve seat and dropping back to the given distance;

radial means to cooperate with said cam means, said radial means being connected to the valve member for control thereof;

actuating means to rotate said radial means to slide the radial means along said cam means thereby to move said valve member from one of its two positions to the other position and to return the valve member to said one position, said actuating means including:

a first fixed circular series of ratchet teeth;

a second fixed circular series of ratchet teeth, said two circular series being spaced apart axially with the teeth of each series directed towards the teeth of the other series;

a rotatable ring between said two fixed series of teeth having freedom for axial movement;

a third circular series of ratchet teeth on the side of the ring towards said first series of teeth to cooperate therewith;

a fourth circular series of ratchet teeth on the side of the ring towards said fixed second series of teeth to cooperate therewith;

a rotary assembly keyed to said valve member and said radial means for rotation therewith with freedom for axial movement relative thereto;

spring means biasing said assembly in one axial direction;

a solenoid operable to shift said assembly in the opposite axial direction in opposition to said spring means;

dog means carried by said assembly adjacent the fourth series of teeth on one side of the ring to cooperate with the fourth series of teeth to shift the ring into engagement with said first fixed series of ratchet teeth; and means projecting from said assembly on the other side of the ring to press the ring against the second fixed series of teeth, said dog means and said projecting means straddling the ring and being spaced apart to permit freedom for axial movement of the ring therebetween, said first and third ratchet teeth being inclined to cooperate to cause an increment of rotation of the ring in one direction from a starting position in response to movement of the ring by the dog means against the first series of ratchet teeth, said second and fourth ratchet teeth being inclined to cooperate to cause an increment of rotation of the ring in said one direction in response to return movement of the ring against the second series of teeth by said projecting means, said dog means being shaped to cooperate with said fourth set of ratchet teeth to cause an increment of rotation of the assembly in the direction opposite to said one direction in response to movement of the dog means against the fourth set of teeth while the ring is immobilized by mutual engagement of the first and third series of ratchet teeth, whereby energization of said solenoid to shift said assembly axially in one direction causes, first, incremental rotation of the ring in the opposite direction by the first fixed series of ratchet teeth and then incremental rotation of the assembly in said one direction by cooperation of the dog means with the fourth series of ratchet teeth on the ring, and de-energization of the solenoid to shift the assembly axially in the opposite direction causes cooperation of the fourth series of ratchet teeth on the ring with the second fixed series of ratchet teeth to advance the ring in said opposite direction to place the ring in a new starting position.

* * * * *